United States Patent [19]
Kozora

[11] Patent Number: 5,324,339
[45] Date of Patent: Jun. 28, 1994

[54] METHOD FOR MONITORING THE PERFORMANCE OF A GLASS CONTAINER FORMING MACHINE

[76] Inventor: Joseph W. Kozora, P.O. Box 559, Valencia, Pa. 16059

[21] Appl. No.: 893,796

[22] Filed: Jun. 4, 1992

Related U.S. Application Data

[63] Continuation of Ser. No. 521,326, May 9, 1990, Pat. No. 5,139,559.

[51] Int. Cl.$^5$ .............................................. C03B 9/38
[52] U.S. Cl. ................................. 65/29; 65/72; 65/130; 65/162; 65/163; 65/318; 65/319
[58] Field of Search ..................... 65/29, 72, 130, 162, 65/163, 167, 318, 319, 322

[56] References Cited

U.S. PATENT DOCUMENTS

| | | | |
|---|---|---|---|
| 1,911,119 | 5/1933 | Ingle | 65/167 |
| 2,508,890 | 5/1950 | Rowe | 65/319 |
| 2,702,444 | 2/1955 | Rowe | 65/167 |
| 2,755,597 | 7/1956 | Rowe | 65/167 |
| 3,607,206 | 9/1971 | Foster et al. | 65/319 |
| 4,613,352 | 9/1986 | Krumme et al. | 65/318 |

FOREIGN PATENT DOCUMENTS 3025333  1/1982  Fed. Rep. of Germany ........ 65/319

Primary Examiner—Robert L. Lindsay
Attorney, Agent, or Firm—George C. Atwell

[57] ABSTRACT

A method of collecting data to indicate certain internal conditions during the function of a glass container forming machine, and apparatus for the practice of the method including sensing devices within a plunger cycling mechanism of the machine for transmitting information from the mechanism during the operation of the machine.

5 Claims, 4 Drawing Sheets

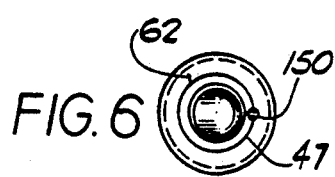
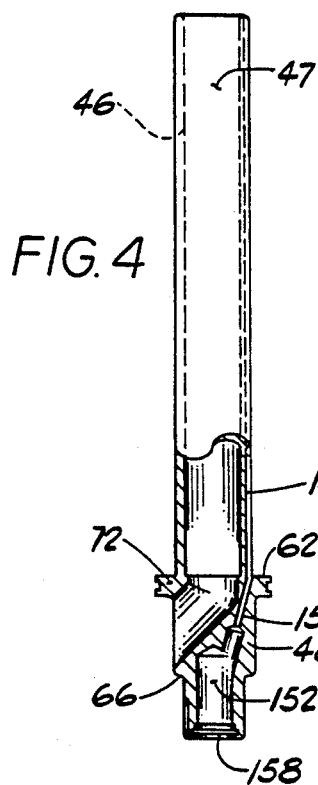
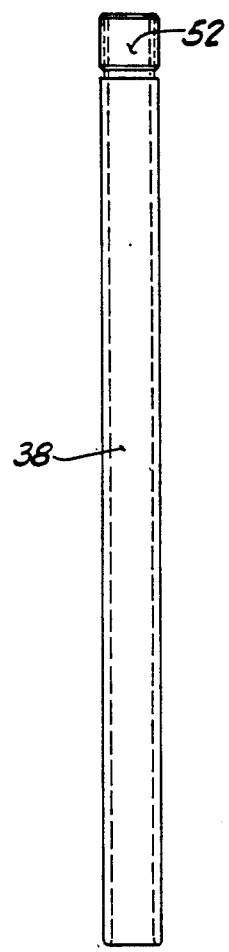
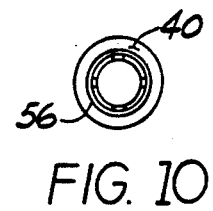
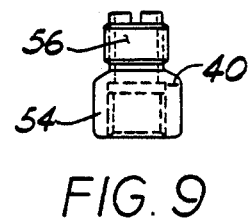
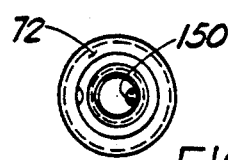

METHOD FOR MONITORING THE PERFORMANCE OF A GLASS CONTAINER FORMING MACHINE

This application is a continuation of applicant's earlier filed patent application Ser. No. 07/521,326, filed May 9, 1990, now U.S. Pat. No. 5,139,559.

BACKGROUND OF THE INVENTION

In the art of glass container manufacture, it is typical standard practice to utilize an individual section machine in which a number of machine sections are mounted side-by-side on a single machine bed to operate in synchronization with each other while being independently adjustable. In the utilization of a press and blow method of glass container production in an individual section machine, discrete molten glass gobs are fed into an upwardly-open blank mold after which the mold is closed at the top by a baffle. Although a single gob mold may be utilized, it is more common to have a plurality of molds in a section, such as double gob or triple gob arrangements. Then, separate molten glass gobs are fed simultaneously to each mold in the section.

For each mold, a vertically-elongated pressing plunger is driven upwardly to press the molten glass into the blank mold and into an adjacent neck ring mold, forming a parison from the glass gob. The plunger is then downwardly retracted and the blank mold and the baffle are temporarily removed so that the parison can be removed and inverted by the neck ring mold from the blank to a laterally adjacent blow mold station where the final formation of the glass container occurs by a blowing operation.

For each blank mold, there is a separate mechanism for supporting and driving a pressing plunger for initially forming the parison in cooperation with the mold, and this mechanism includes a vertically-elongated cylinder mounted to support an axially-oriented piston rod within the cylinder's longitudinal bore. The pressing plunger is removably mounted by means of an adapter to the upper end of the piston rod whereby the plunger can be cycled through its pressing operation.

The piston and piston rod are an integral structure driven to cycle linearly by pressurized air fed into the cylinder's chamber. The plunger is cooled during its gob pressing operation by a relatively high-pressure air flow directed through the cylinder's bottom end structure and upwardly through a rigid air tube on which the hollow piston vertically slides. The air stream directed upwardly through the air tube and into the piston bore enters an elongated distributor projecting internally within the hollow plunger. The air flow is dispersed by the distributor within the plunger and returned downwardly through an array of exhaust passages or ports circumferentially arranged, usually in the bottom flange of the distributor. The exhaust air then passes through communicating openings in component structure of the adapter utilized to retain the plunger in its operative position on the piston rod.

The upper end of the cylinder casing serves as a collecting chamber for the exhaust air which may then be emitted outwardly through a laterally mounted exhaust manifold. The exhaust manifold in a plural gob section may be a unitary structure extending across a bank of aligned cylinders with a sidewall opening in each upper cylinder casing in sealed air flow communication with the exhaust manifold. Vertically-extending exhaust conduits may be utilized to direct the exhaust air flow downwardly for emission into the section box beneath the cylinders.

In the type of glass container forming machine heretofore generally described, a continuing problem is the control of machine performance to obtain consistent quality in the glass containers produced at a high production rate. Variance of conditions associated with the machine's operation will significantly affect the finished product. The failure to hold within a proper range such parameters as gob temperature, plunger dwell, rate of heat removal from the plunger by the cooling air flow, air pressure within the cylinder, and gob size or weight can result in the formation of rejected or inferior containers.

There have been many approaches to controlling one or more of the conditions associated with the machine's operation, none of which have been entirely satisfactory. One common method involves the operator of the machine making manual adjustments to various controls in accordance with his prior experience and the results of his visual inspection of the quality of glass containers delivered from the machine, the object being to correct, through trial and error, those conditions contributing to the noticed defects whereby subsequently produced containers will be of higher quality. Another method utilized, particularly addressing the control of gob weight for the purpose of having each gob contain sufficient glass to form an acceptable container, has been to weigh the finished product and utilize this after-attained information to adjust incoming gob weight in accordance with the findings in the weighing operation.

A recent development and significant advancement in controlling gob weight recognizes the direct relationship between the extent of advancement of the plunger into the gob and the size of the gob being pressed. This requires knowing the position of the plunger and the extent of its penetration into the gob as it occurs, whereby plunger position can be correlated with gob weight and gob weight can be continuously adjusted through the use of appropriate control station means of interpreting the received data and automatically controlling the timing of gob shearing, etc. To accomplish the foregoing, a proximity sensor has been mounted on the cylinder of a plunger mechanism to detect vertical movement of an angled surface on the plunger assembly and, by the variance in proximity of the angled surface, the position of the plunger has been extrapolated.

The foregoing method, while a significant move toward a worth objective, fails to take into account other parameters or conditions subject to fluctuation within the equipment during its operation which, unless they are also monitored and controlled, prevent accurate control of gob weight by simply monitoring plunger position at full penetration.

SUMMARY OF THE INVENTION

This invention pertains generally to quality control of containers produced in a glass container forming machine and more particularly pertains to a method and apparatus for collecting critical data directly from within the gob pressing mechanism as the mechanism is functioning.

The present invention comprehends the provision of a method of collecting data to indicate, continuously and simultaneously during the press and blow operation of a glass container forming machine, the temperature and variance of the cooling air flow within the plunger cycling mechanism, the pressure of the cooling air flow, and the linear position of the plunger, whereby the data collected during the actual gob pressing function can be interpreted at a remote operating location and utilized for adjustment and control of conditions affecting initial formation of glass containers without interrupting the continuing operation of the machine.

The invention further comprehends the provision of apparatus constituting a combination of certain devices for efficiently accomplishing the data collection under dynamic operating conditions.

Inasmuch as the method and apparatus of the present invention has the capability to separately collect data and thereby monitor the performance of the parison forming equipment associated with each cylinder of a plural-gob section, it is believed most appropriate to refer to the method and apparatus herein disclosed as a Cylinder Performance Monitoring System.

The system includes a method of collecting data to indicate performance in a glass container forming machine adapted to perform a press and blow operation in the formation of glass containers. The basic practice of the method involves providing position-reactive means, on the machine, for sensing, during the gob-to-parison pressing operation, the linear position of the plunger; and, providing pressure-reactive means on the machine for sensing the pressure of the incoming cooling air to the plunger and, providing a temperature-reactive means on the machine for sensing the temperature of the exhaust air flow at the same time the linear position of the plunger and the air pressure are being sensed; and, further, providing means for transmitting the sensed information to a remote location for comparative interpretation and use in controlling and adjusting machine performance to obtain high quality containers.

The apparatus for practicing the method of the invention includes a novel arrangement of structural elements for accomplishing the objectives of the method, particularly with respect to the means of sensing the linear position of the plunger.

A primary objective of the invention is to facilitate practice of the method by mounting the plural sensing means at critical points within the structure of the glass container forming machine in an arrangement that permits rapid manual withdrawal and replacement, as a unit, of each cylinder in the machine.

Details, features, and advantages of the Cylinder Performance Monitoring System herein disclosed will be best understood and appreciated from the ensuing detailed description of the preferred embodiment of the invention, with reference to the accompanying drawings.

BRIEF DESCRIPTION OF THE DRAWINGS

FIG. 3 is a side elevational view of an air tube component first shown in FIG. 1;

FIG. 4 is a side elevational view, partially cut away in vertical section, of a component of the structure first shown in FIG. 1;

FIG. 5 is a bottom plan view of the structure illustrated in FIG. 4;

FIG. 6 is a top plan view of the structure illustrated in FIG. 4;

FIG. 8 is a side elevational view of an air tube component first shown in FIG. 1;

FIG. 9 is a side elevational view of a connector element first shown in FIG. 1;

FIG. 10 is a top plan view of the connector element shown in FIG. 9; and

DETAILED DESCRIPTION OF THE PREFERRED EMBODIMENT

Figures 1, 7:
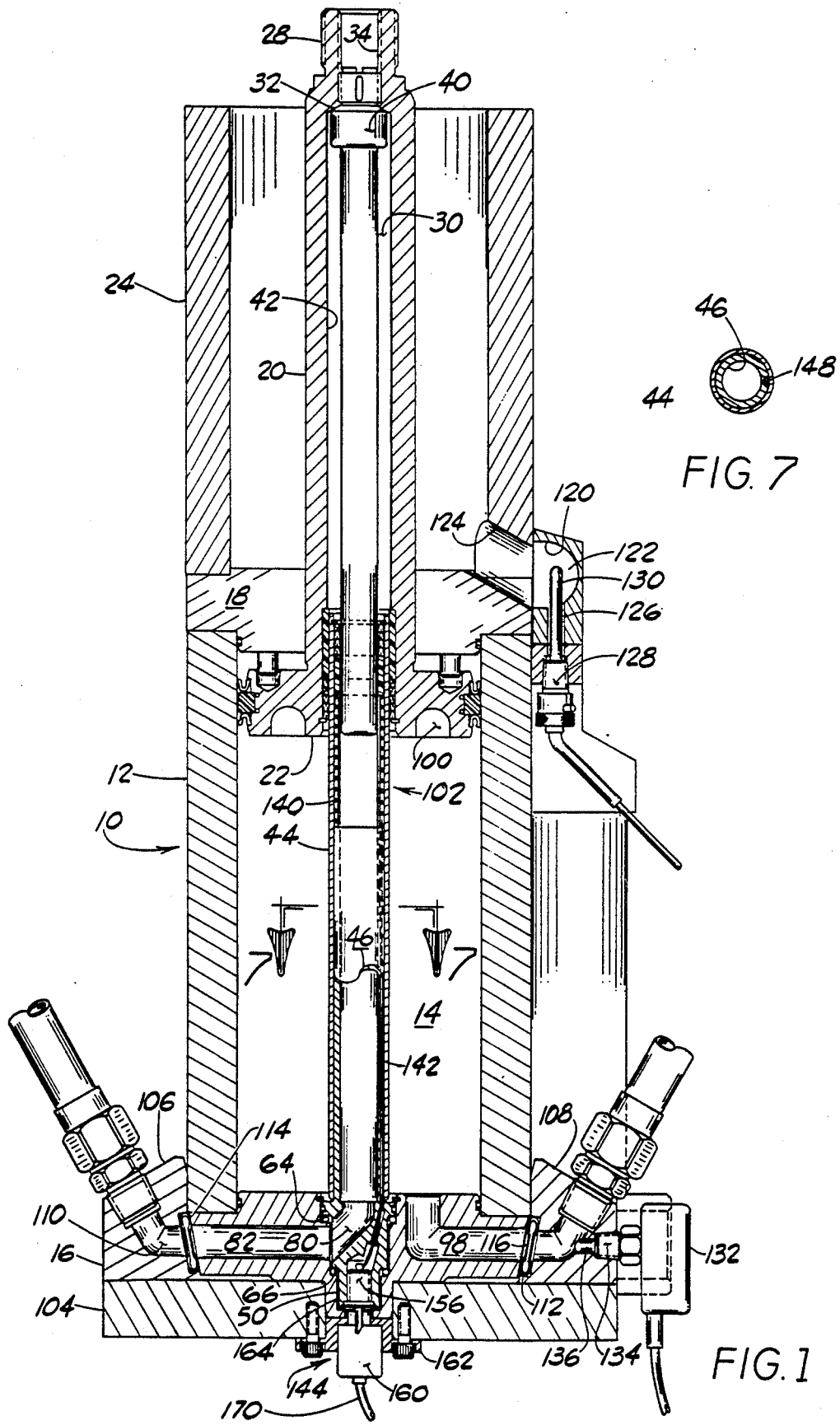
FIG. 1 is a view in vertical section illustrating a plunger cycling mechanism of a glass container forming machine, in accordance with the present invention.
FIG. 7 is a horizontal sectional view taken along Line 7—7 of FIG. 1.

FIG. 1 illustrates a plunger cycling mechanism 10 for an individual section glass container forming machine, having a cylinder or casing 12 defining a chamber 14. The cylinder base or bottom is an end cap 16, and the upper end of the cylinder is defined by an intermediate cap 18. Extending axially upwardly through the chamber 14 is a piston rod 20 having a lower end radially outwardly flanged portion 22 which constitutes a piston formed integrally with the rod 20. The piston rod 20 and the piston 22 are adapted for air-driven linear vertical movement to cycle a plunger (not shown) in a press and blow operation. A circular casing 24 is disposed above the cylinder 12 and serves to contain certain plunger positioning elements (not shown). Also not shown in FIG. 1 are the seals and bearings which would be supported by the intermediate cap, about the piston rod 20, to facilitate its reciprocal operation. For a more detailed understanding of the structure and operation of an individual section machine generally, reference should be made to the Ingle U.S. Pat. No. 1,911,119 or certain patents issued to G. E. Rowe, particularly U.S. Pat. Nos. 2,508,890; 2,702,444; and 2,755,597.

Beginning at the upper end 28 of the piston rod 20, a central circular full-length bore 30 is provided within the piston rod 20. Within the bore 30 is an annular shoulder 32 separating a narrowed short bore segment 34 from the major wider bore portion therebeow which extends the remainder of the length of the piston 20 and is of uniform diameter.

Figure 2:
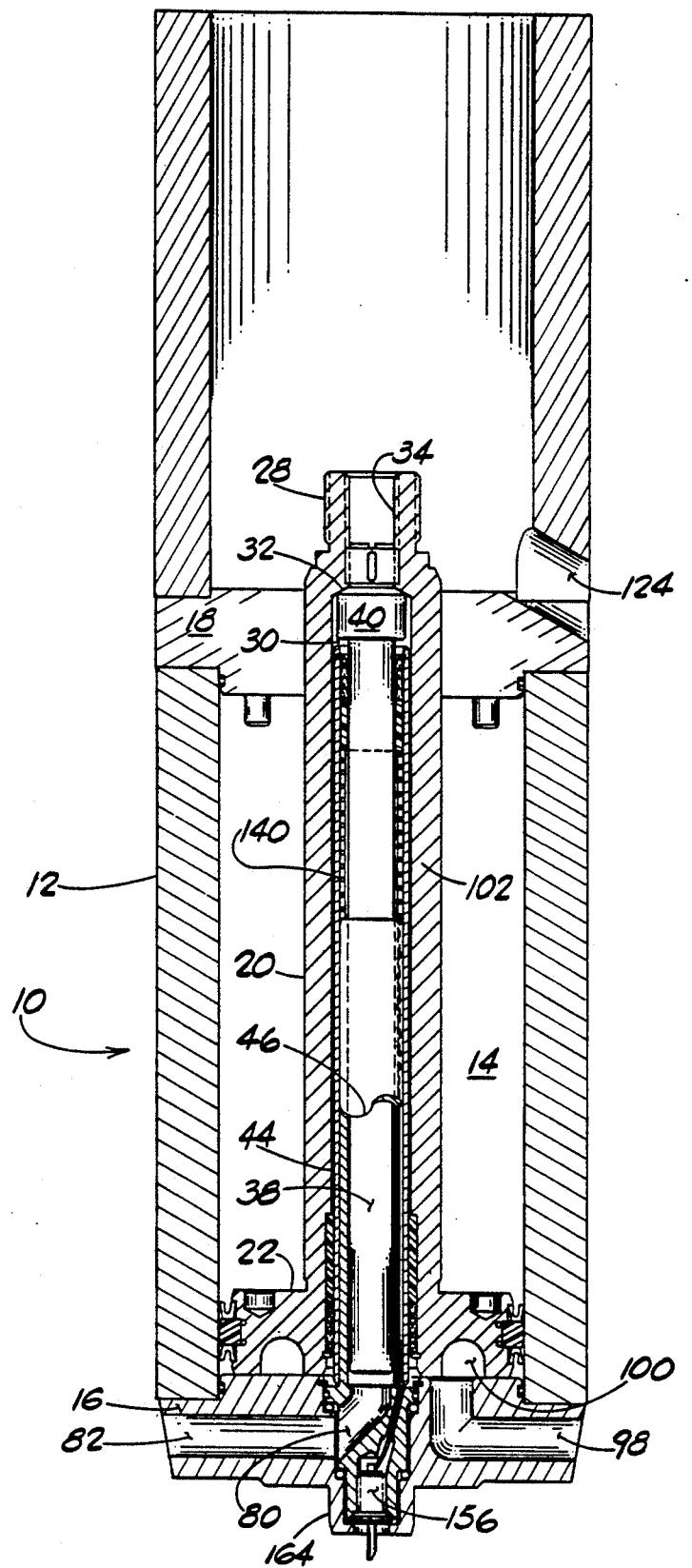
FIG. 2 is a view in vertical section of the same plunger cycling mechanism shown in FIG. 1, but with less detail, illustrating the retraction or maximum-down position of a piston rod and associated structure first shown in the maximum-down position in FIG. 1.

Also shown in FIG. 1 and 2 is air tube structure including a first tube or tubular member 38, the upper end of which is secured within the upper end of the piston rod 20 by a connecting member 40. Between the inside wall surface of the piston rod 20 and the tube 38 is an annular space 42, and extending within the annular space 42 is the upper end of a second tube or tubular member 44 which projects upwardly from the inward surface of the end cap 16. Securably press-fit into the second tubular member 44 is a tube liner 46 having an upper tubular portion 47 and a lower end solid base portion 48 (see FIG. 4) secured in a socket 50 in the end cap 16.

The first tubular member 38 is shown as it appears removed from the mechanism 10, in FIG. 8, and details of the tube base connector 40 are shown in FIGS. 9 and 10. FIG. 3 shows the second tubular member 44 as it appears removed from the mechanism, and FIG. 4 shows the tube liner 46. The tubular members 38 and 44 are of rigid relatively thin-walled construction. The liner 46 is also rigid, and its upper portion 47 is tightly press-fit into the tube 44. The tube 38 has an upper end 52 which is designed to be sealably threaded into a socket end 54 of the connector 40, and the narrow end 56 of the connector 40 is sealably threaded into sealed securement within the lower end of the bore segment 34 in the piston rod 20, as shown in FIG. 1.

The second tubular member 44 is held in its fixed operative position, projecting upwardly from the end cap 16, by means of the tube liner 46. The lower end of the tubular member 44 abuts an annular ledge 62 of the liner 46. The lower solid end or base portion 48 of the liner 46 has annular shoulders 64 and 66 which compress against O-rings resting on complementary shoulders 68 and 70 in the socket 50 of the end cap 16, as shown in FIG. 1. The base portion 48 (FIG. 6) also has an integral annular ridge 72 with an annular recess 74 to accommodate a seal ring 76 (FIG. 1). A circular snap-ring 78 fits into an accommodating annular groove at the upper end of socket 50 of the end cap 16 and projects outwardly over the upper surface of the ledge 72 to retain the liner 46 in secured fixed mounted position on the end cap 16. The liner 46 has an angled transitional opening 80 which is in sealed air flow communication with a cooling air opening or port 82 entering laterally through the body of the end cap 16.

The bore 30 of the piston rod 20, at its lower end, is widened to accommodate an annular bearing 86 and an annular seal 90 which are fixed to the piston rod 20 to slide against the outer sidewall surface of the second tubular member 44. Within the second tubular member 44, beginning at the upper end of the liner 46, an annular bearing 92 and an upwardly-successive annular seal 94 are fixed to the inside surface of the tubular member 44 to slide against the sidewall outer surface of the tubular member 38. The internal groove 58 in the upper end of tube 44 (FIG. 5) accommodates a snap-ring to retain the bearing 92 and seal 94 in position against the outer end of the liner 46.

In the function of the mechanism 10 shown in FIGS. 1 and 7, pressurized air to drive the piston 22 and the rod 20 is delivered to the chamber 14 through an air inlet port 98 and into an annular piston recess 100 to move the piston and rod 20 from the maximum down position shown in FIG. 1 to the maximum up position shown in FIG. 7. By other means (not shown), the rod 20 is held in the intermediate blank-loading position during operation of the mechanism. Incoming cooling air flow moves from the port 82, through the transition 80 and upwardly through the lower coaxial tube arrangement 44 and 46. The air flow then moves through the upper tube 38, through the rod bore segment 34 and into the central air passage of the plunger.

The structure and function of the sliding tube-in-a-tube arrangement for directing cooling air flow to the piston 20, as heretofore described, is specifically disclosed as a distinct and separate invention in a separate patent application filed concurrently herewith. A feature of the present invention, however, is the adaptation and modification of the air tube structure to obtain a position reactive means of sensing the linear position of the piston rod, and sense the plunger, in the form of a linear transducer, identified in FIG. 1 by the number 102, which is hereinafter explained in greater detail.

FIG. 1 illustrates a saddle plate 104 having affixed to the upper surface thereof separate port blocks 106 and 108. The saddle plate and port blocks serve as a supporting cradle for the cylinder 10. The cylinder 10 is adapted to be manually withdrawn through an intermediate ring-like positioning plate (not shown) when it is necessary to remove and replace the cylinder. The port blocks 106 and 108 define respective air inlet passages 110 and 112 communicating, respectively, with end cap ports 82 and 98. The passage 110 terminates inwardly on the inward face of the block 106 with a flexible seal 114, and the passage 112 terminates inwardly on its support block with a flexible seal 116. When the cylinder 10 is installed into its operative position on the saddle plate 104, the seals 114 and 116 compressibly complete sealed air flow communication whereby a pressurized flow of cooling air directed inwardly through the passage 110 will move through the port 82 and thence upwardly through the central air tube structure, and a separate air flow directed inwardly through the passage 112 will move through the port 98 and into the chamber 14 for imparting a driving force to the piston 22.

FIG. 1 also illustrates an exhaust manifold 120 mounted laterally on the cylinder structure and having an inner passage 122 in flow communication with an opening 124 for receiving exhaust air flow from within the positioner mount 24. Insertably mounted upwardly through an opening 126 in manifold 120 is a thermocouple device 128 having a sensing tip 130 projecting into the passage 122.

The linear transducer assembly 102, shown in FIGS. 1 and 2, comprises a wound wire coil 140 secured within the second tubular member 44 at the upper termination of the liner 46. Extending from the coil 140 and downwardly through the tube structure are insulated electrical conductors 142, which lead downwardly to a separable connector 144. As shown in FIG. 7, the liner 46 is provided with a longitudinal service groove 148 which provides a passage for the conductors 142 along the inside wall of tubular member 44. At the lower end of tubular member 44, where the annular ridge 72 of the liner 46 projects radially outwardly, the groove 148 merges with a small opening 150 (see FIG. 6) which angles downwardly through the liner base 48 and merges with a socket opening 152 in the base 48 (see FIG. 4). The lowermost ends of the conductors 142 project through the opening 150 and to the separable connector 144, as shown in FIGS. 1 and 2. The connector 144 comprises a female receptacle 156 locked into the socket 152 by means of a groove and snap-ring arrangement 158 (FIG. 4). The connector 144 further comprises a male plug 160 firmly cemented into an accommodating opening in a bracket 162 which is removably attached to the underside of the saddle plate 104 in alignment with an accommodating central opening through a box 164 integral to the end cap 16.

The transducer 102 further comprises the tubular member 38, the lower end of which (as shown in FIG. 1) will move linearly within the coil 140 when the piston 20 nears its maximum linear extension from a cylinder 10. The operation of the linear transducer 102 is effected by inducing a low-voltage electrical current to the coil 140. This is accomplished by directing the electrical current from a remote electrical potential source through a coaxial cable 170 and through the connector 144 and the conductors 142. For the purpose of attaining the linear position function of the transducer 102, the tube 38 must be formed from aluminum or some other non-ferrous material. Energization of the coil 140 creates a magnetic field which, when interrupted by the presence of the lower end of the tube 38 within the coil, directly affects the voltage of the current passing through the coil. The voltage will vary as a function of the vertical position of the end of the tube 38 within the coil 140, and the voltage of the current in the coil can be determined at any point in time by appropriate instrumentation, at a remote operator location, appropriately connected to the coil by means of the coaxial cable 170.

The performance control monitoring device of the present invention comprises utilization of means of sensing certain critical conditions occuring in a plunger cycling mechanism, particularly conditions occuring in the operation of the mechanism's cylinder, to simultaneously collect and report data which can be interpreted and used to adjust controllable functions such as timing and air flow input, and correlating these functions to obtain improved quality in the glass containers being produced. The system preferably includes a position-reactive means within the cylinder for sensing, during the pressing operation, the linear position of the plunder, pressure-reactive means for sensing the pressure of the air stream provided to impart linear pressing motion to the plunger, and temperature-reactive means for sensing the temperature of cooling air being directed to the plunger and to sense the heated exhaust air moving out of the plunger, and further including means to continuously transmit the sensed conditions to a remote operator location for processing and correlation whereby adjustments can be continuously performed, as required, either manually or by computerized control means, to maintain optimum operating conditions with the mechanism.

The position-reactive means is preferably the linear transducer 102 shown in FIG. 1, including an electrical field coil installed within an air tube of the machine as heretofore described. The pressure-reactive means is preferably a pressure transducer device, such as the device 132 shown in FIG. 1, installed to continuously sense pressure of the air flow moving through the passage which communicates with the port providing air to the chamber 14 of the piston 10. The temperature-sensing means preferably includes a thermocouple mounted somewhere on the incoming air line to the cylinder (not shown) and a device, such as thermocouple 128, mounted directly in the exhaust air stream of the mechanism. With respect to the means of sensing the incoming air pressure, it is preferred, in a multiple-gob section, to have the thermocouple located to sense the temperature of the air flow before it divides into separate conduits to each cylinder of the section whereby only one thermocouple needs to be used for this purpose on a double-gob or triple-gob section, etc. It is also of significant importance that the sensing devices be appropriately located and installed to perform their function without interference with removal and replacement of the cylinder 10 relative to the saddle plate 104 and port blocks 106 and 108. Accordingly, the thermocouple 128 is placed in the exhaust manifold which, like the port block 108 on which the pressure transducer 132 is mounted, remains in place during change of the cylinder. In this regard, it should be noted that the coil 140 is a constituent part of the air tube structure assembly which "comes with" and remains within each cylinder assembly as a constituent part thereof, and that the separable connector 144 is adapted to separate as a function of the removal of the cylinder from its mounted position and to automatically rejoin and complete the circuit to the coil as a function of replacement of the cylinder into its mounted position.

In the cylinder performance monitoring system of the present invention, the importance of obtaining comparative data on the cooling and exhaust air flow and the pressure of the piston-impelling air flow, along with the linear position of the plunger during the gob-pressing operation. The plunger-impelling air flow can be interpreted to determine the speed at which the plunger moves to its maximum position. Measuring the temperature of incoming air and then comparing it to the exhaust temperature provides a means of calculating and then controlling the temperature, and, hence, the rate at which heat is extracted from the parison during the parison-forming operation. Knowing the linear position of the plunger at its uppermost dwell point and the distance the plunger travels before it is stopped by the pressure of the glass in the mold can be interpreted to determine the volume of glass in the blank. The sensing and collecting of such data, simultaneously and continuously during the parison-forming operation, enables continuous process control never before attained.

Because the plunger which is pressed into the glass gob to form the parison is metal, the intense heat of the glass transfers to the highly conductive metal and causes physical expansion whereby the plunger actually increases in length and direct proportion to the amount of heat it absorbs. Hence, the actual distance of penetration of the plunger into the glass is function of temperature within the plunger. The temperature data received by the monitoring system herein described can be utilized to more closely maintain an ideal operating temperature whereby more accurate linear positioning of the plunger can be determined at the critical dwell point.

The pressure of the air within the cylinder which advances the piston and, hence, the plunger in its pressing operation, goes from zero and gradually to maximum pressure in response to the resistance of the glass gob which finally halts the upward movement of the plunger. When the glass stops the upward penetration of the plunger, air is still being applied to the piston, and since the air in the cylinder chamber is compressible, the viscosity of the glass in the mold will determine the final stopping point of the plunger at which point the maximum air pressure can be determined by the pressure transducer 132.

By virtue of the system herein disclosed, the temperature can be maintained at a desired parameter whereby the plunger is not being overheated or underheated. At this known temperature, the performance of the cylinder can be determined by ascertaining how quickly the pressure being delivered to the cylinder moves the plunger to the position of full penetration, and the distance of travel of the plunger can be utilized, in view of its direct relationship to gob weight, to control gob weight and vary it as necessary. By monitoring the temperature of the air flow through the plunger, the air pressure against the piston, and the linear advancement of the plunger, the quality of glass containers being formed can be known without ever examining a finished container delivered from the machine.

Figure 11:
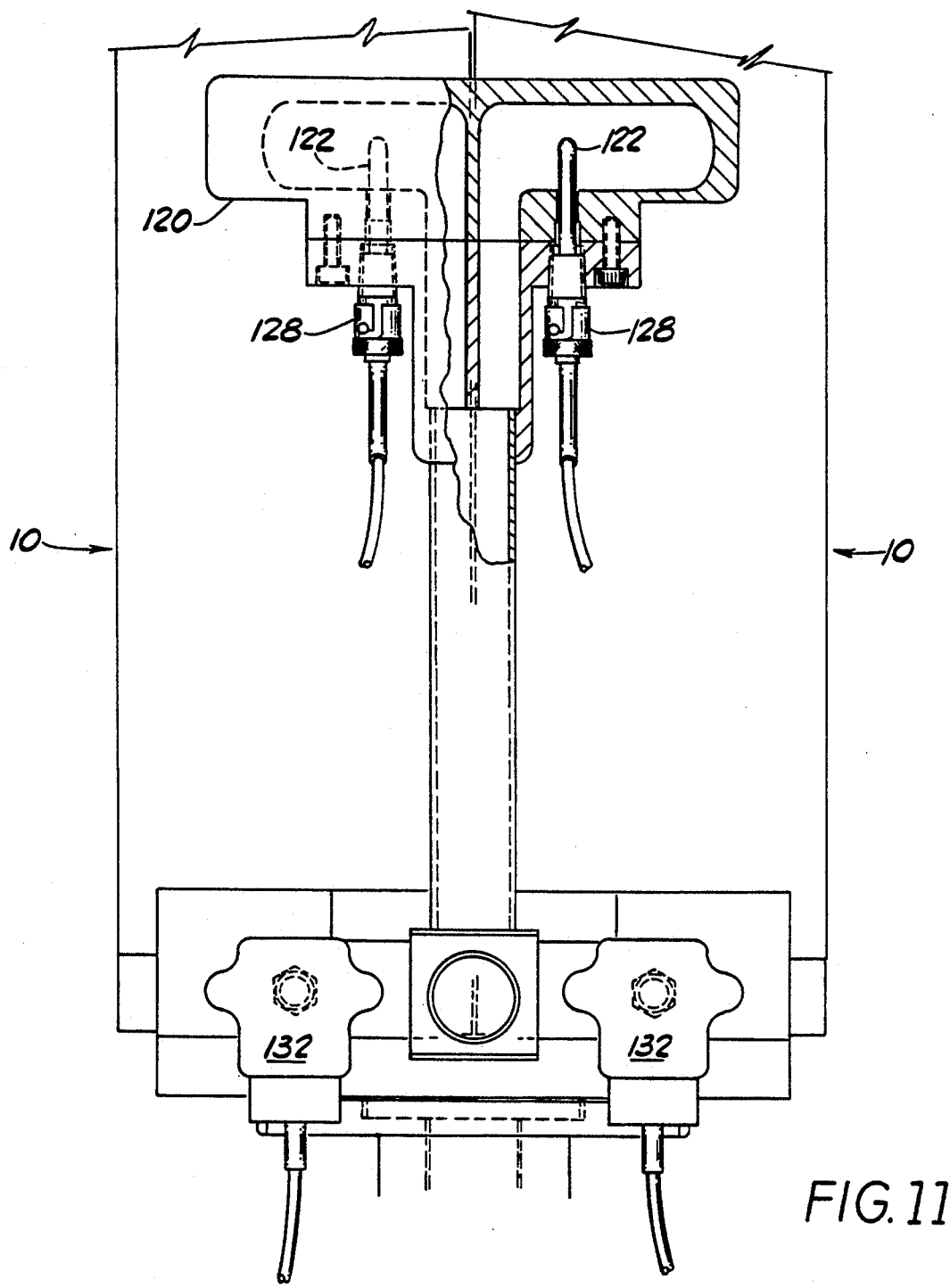
FIG. 11 is a fragmentary side elevational view of an alternate double-gob arrangement of plunger cycling mechanisms in accordance with the present invention.

The cylinder performance monitoring system of the present invention enables separate monitoring of each cylinder in a plural-gob section, as illustrated in FIG. 11. Each cylinder would have, as shown in FIG. 11, its own linear transducer to monitor the up position of the plunger, and separate thermocouples 128 and pressure transducers 132 would be utilized to respectively separately monitor the temperature and pressure conditions in the separate cylinders 10.

The present invention has been described and illustrated in connection with a presently preferred embodiment, however, it is to be understood that other modifications and variations may be resorted to without departing from the spirit and scope of the invention, as those skilled in the art will readily understand. Such modifications and variations are considered to be within the purview and scope of the invention and the appended claims.

I claim:

1. A method of collecting data to indicate performance in a glass container forming machine of the type having a section with a plurality of cylinders, wherein each cylinder has an internal chamber for receiving pressurized air to push a piston and the piston supports a reciprocal piston rod for cycling a pressing plunger into a molten glass gob held in a blank mold, a pressurized air conduit means for providing cooling air internally through the plunger including an air flow inlet channel through the cylinder and thence through the bore of the piston rod to the plunger, and an air flow exhaust port receiving heated air from the plunger, comprising the steps of:

(1) providing a position-reactive means, on the cylinder, for sensing, during the pressing operation, the linear position of the plunger;
   (2) providing pressure-reactive means adjacent the cylinder for sensing air pressure within the cylinder chamber at the same time the linear position of the plunger is being sensed;
   (3) providing temperature-reactive means adjacent the cylinder for sensing the temperature of the exhaust air flow from the plunger at the same time the linear position of the plunger and the air pressure is being sensed; and
   (4) providing means for transmitting the sensed linear position of the plunger, the sensed air pressure, and the sensed temperature to a remote location for comparative interpretation and use in controlling and adjusting conditions affecting quality of containers being produced by the machine.

2. The method of claim 1 including the further steps of:

(5) providing temperature-reactive means for sensing the temperature of the incoming air flow to the air conduit means; and
   (6) transmitting the temperature sensed in the preceding step to the remote location for comparison to the sensed and transmitted temperature of the exhaust air flow for improving the capability to control and adjust the operative conditions of the machine.

3. The method of claim 1 comprising the further step of establishing an electrical field within the cylinder as part of the position-reactive means.

4. The method of claim 3 comprising the further step of providing a means on the piston rod for interrupting the electrical field in accordance with linear movement of the piston rod.

5. The method of claim 1 comprising the further steps of:

(5) providing, as part of the position-reactive means, a magnetic field in the form of a coil disposed on a stationary air tube component within the cylinder;
   (6) providing an air tube component moveable with the piston rod nd formed from a non-ferrous material to slide within the stationary tube and within the coil; and
   (7) establishing the end of the non-ferrous movable tube at a point relative to the coil whereby the length of extension of the tube through the coil will diminish as a function of upward movement of the piston rod.

* * * * *